Figure 1:
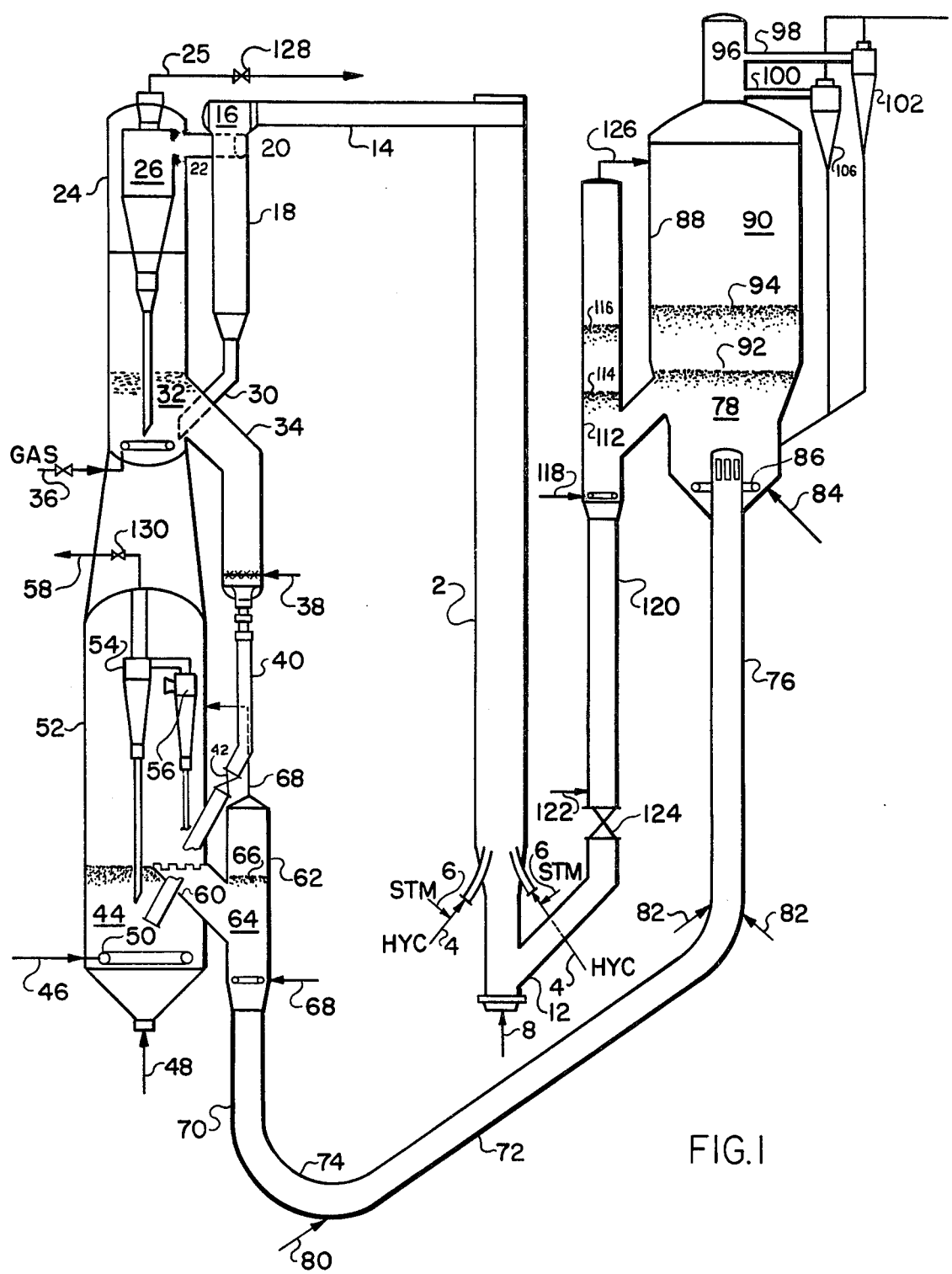

United States Patent [19]

Dean et al.

[11] 4,331,533
[45] May 25, 1982

[54] METHOD AND APPARATUS FOR CRACKING RESIDUAL OILS

[76] Inventors: Robert R. Dean, #1 Columbine La., Littleton, Colo. 80123; Jean-Louis Mauleon, 15656 E. Grand Ave., Aurora, Colo. 80112; Robert W. Pfeiffer, 6 Alden Pl., Bronxville, N.Y. 10708

[21] Appl. No.: 169,087

[22] Filed: Jul. 15, 1980

[51] Int. Cl.³ ..................... C10G 11/18; C10G 11/04; B01J 21/20; B01J 29/38
[52] U.S. Cl. .................... 208/113; 208/120; 208/151; 208/161; 208/164; 252/417; 422/144; 422/145
[58] Field of Search ................ 252/417, 419; 208/113, 208/164

[56] References Cited

U.S. PATENT DOCUMENTS

| | | | |
|---|---|---|---|
| 2,398,739 | 4/1946 | Greensfelder et al. | 252/417 |
| 2,414,002 | 1/1947 | Thomas et al. | 252/417 |
| 2,434,567 | 1/1948 | Jahnig et al. | 252/417 |
| 2,459,474 | 1/1949 | Upham | 252/417 |
| 4,026,789 | 5/1977 | James | 208/164 |
| 4,176,084 | 11/1979 | Luckenbach | 252/417 |

FOREIGN PATENT DOCUMENTS 2001545 2/1979 United Kingdom ................ 252/417

*Primary Examiner*—P. E. Konopka
*Attorney, Agent, or Firm*—Carl D. Farnsworth

[57] ABSTRACT

A hydrocarbon conversion-catalyst regeneration process and apparatus is described for converting residual oils and regeneration of catalyst in two separate low and higher temperature regeneration stages stacked one above the other on the same or different vertical axis to provide catalyst at a temperature above the residual feed pseudo-critical temperature. A CO rich flue gas is recovered from the low temperature regeneration stage and a $CO_2$ rich flue gas is recovered from the higher temperature regeneration stage. The temperature of the catalyst mixed with the residual oil feed is sufficient to obtain substantially complete vaporization of the residual oil charge. A special arrangement of apparatus is provided in the lower portion of a riser conversion zone to obtain the intimate vaporization contact between residual oil feed and the high temperature catalyst charged to the riser.

6 Claims, 4 Drawing Figures

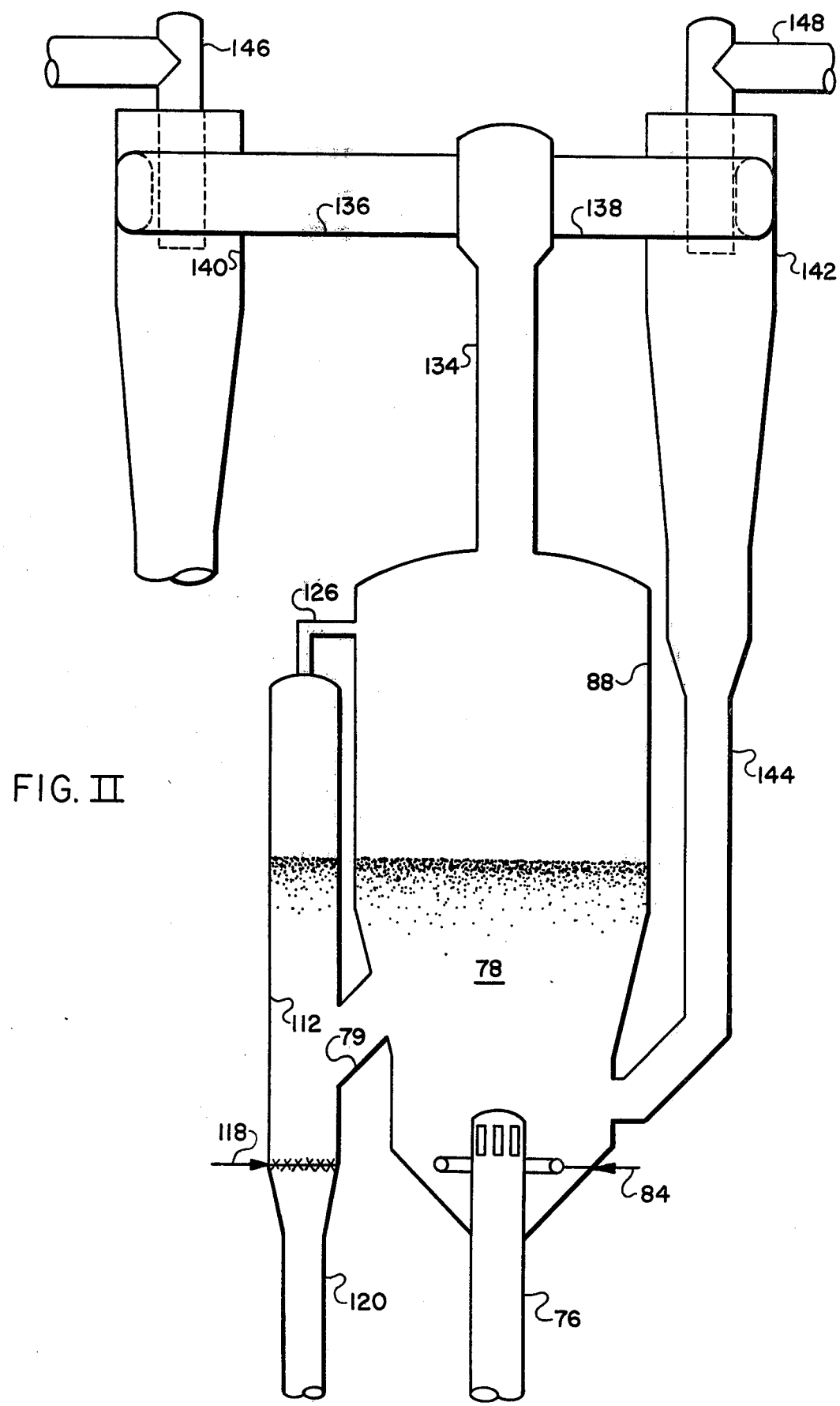
FIG. II

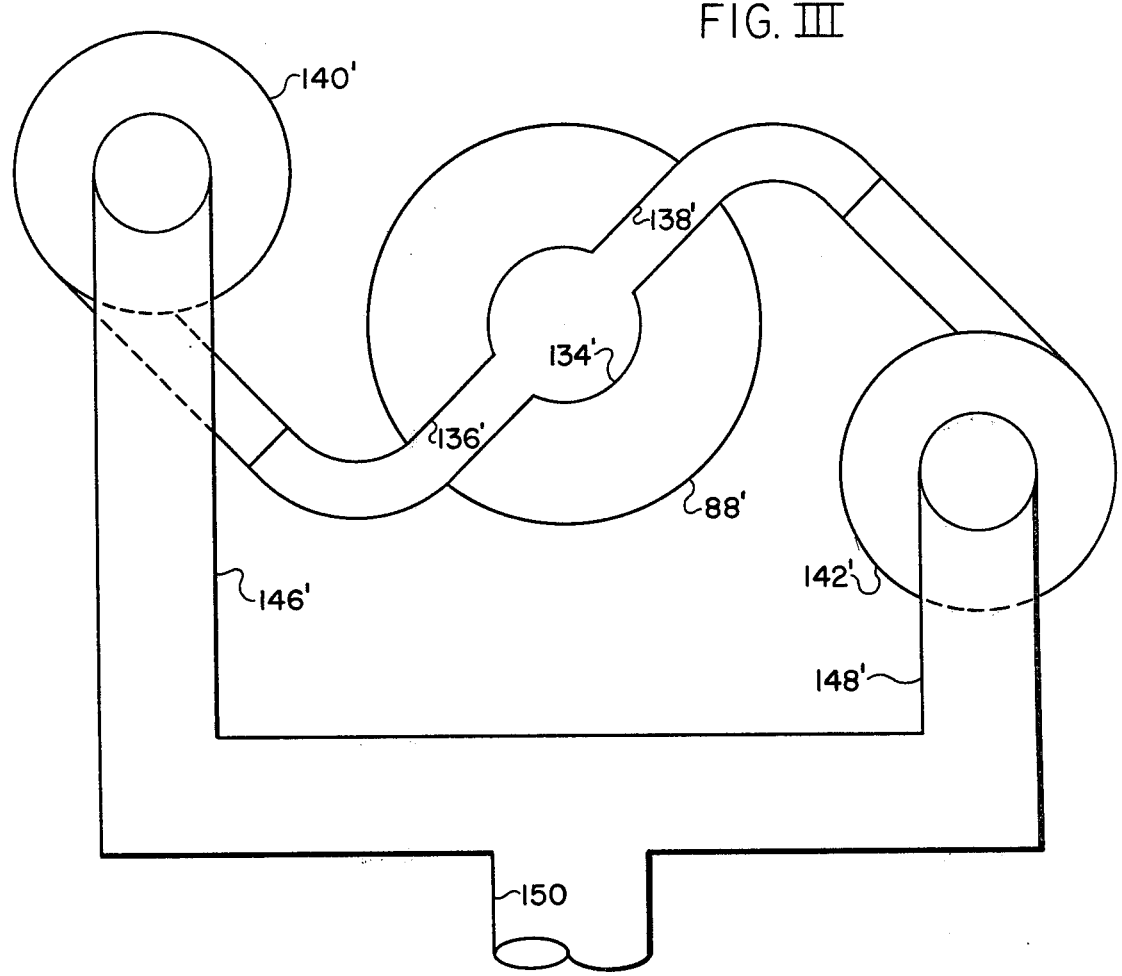

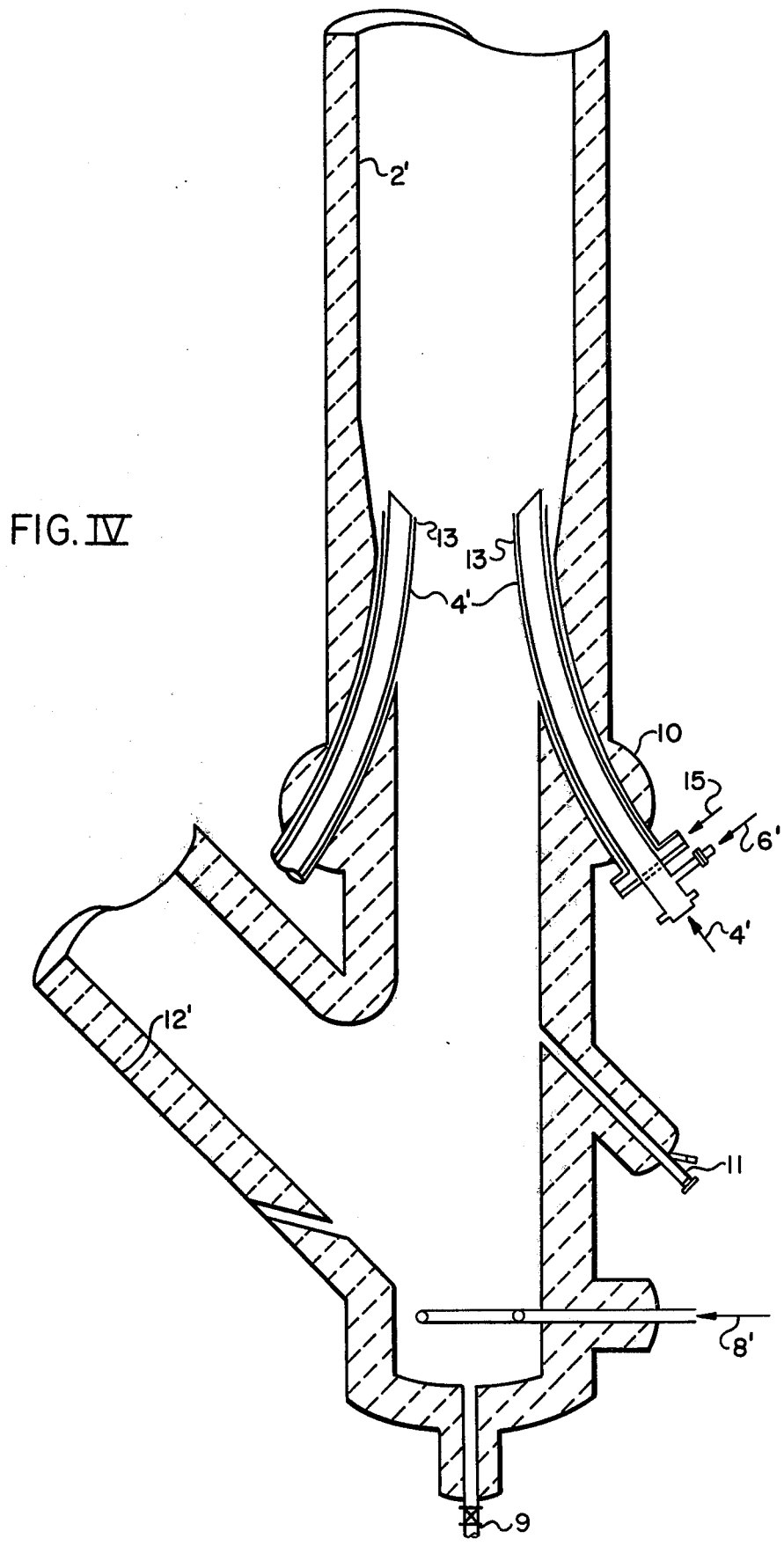
FIG. IV

METHOD AND APPARATUS FOR CRACKING RESIDUAL OILS

The prior art identifies residual oils as residual, reduced crude oils, atmospheric tower bottoms, topped crudes, vacuum resids, or simply heavy oils. Such high boiling portions of crude oils are also known as comprising very refractory components, such as polycyclic aromatics and asphaltenes, which are considered difficult to catalytically crack to form high yields of gasoline plus lower and higher boiling hydrocarbon fractions because of the deposition of large amounts of coke on the catalyst. Furthermore, metal contaminants in the heavy oil fractions of crude oil comprising vanadium, nickel, copper, iron, etc. are deposited on and/or in the pores of the catalyst, thereby further poisoning and/or inactivating the catalyst so employed. Indeed the prior art considers that the effect of the coking tendencies of the heavy oil fractions plus the heavy metals effect are so over powering that the resulting product yield structures are unacceptable in terms of industry economics.

In view of prior art identified problems for processing heavy crudes and bottom fractions thereof, comprising such contaminants, it has been previously proposed to effect a separation of materials comprising the residual or heaviest fractions or to effect a preconversion of the heaviest and undesirable components. Different techniques to accomplish the desired separation, such as vacuum distillation, solvent extraction, hydrogenation or certain thermal cracking process, have been relied upon in the prior art for contaminant separation or control. Adsorption of undesired components, particularly metal components, on particulate material of little or no cracking activity has also been employed. Thermal cracking, such as delayed and fluid coking, as well as visbreaking operations, have been employed to upgrade heavy residual oils; however, the resultant products boiling above 400° F. have not proven to be particularly good feed stocks for fluid catalytic cracking due to resultant high concentrations of polynuclear compounds.

Residual oil comprising relatively high boiling fractions of crude oil obtained as atmospheric tower bottoms and/or vacuum tower bottoms contained therein are, therefore, regarded as distress stocks by the petroleum industry because the oils contain large quantities of components generally considered to have coke forming tendencies as well as heavy metals components. For example, a residual oil may contain a carbon residue in excess of 0.6% by weight, and this characteristic is considered by the industry to contribute to producing high additive coke in a cracking operation and along with the high metals levels will operate to rapidly deactivate the cracking catalyst, leading to uneconomic yield results. Hence, the prior art has tended to exclude these materials from fluid cracking feeds.

Residual oils for the purpose of this invention can include materials boiling from 400° F. to the final end point of crude oil, in excess of 1800° F. Contained in this broad boiling range feed stock can be light gas oils boiling from about 400° F. to 700° F., medium gas oils boiling from about 600° F. to 850° F., heavy gas oils boiling from about 600° F. to 1200° F., and components boiling beyond 1200° F. up to the final boiling point of the crude oil, including carbon producing components, such as polycyclic aromatics, asphaltenes and metal contaminants, as well as whole crudes. Separately prepared stocks such as those prepared by solvent extraction or hydrogenated stocks may also be included as feed to the process.

It is generally considered that the fluid catalytic cracking of feeds containing components boiling beyond 1200° F. leads to poor conversion to gasoline and lighter components, high coke production and excessive temperature levels during the regeneration step. The excessive regeneration temperatures are considered harmful both to conventional equipment and to the catalyst employed in the process.

THE INVENTION

This invention relates to the simultaneous conversion of both the high and low boiling components contained in residual oils with high selectivity to gasoline and lighter components and with low coke production. The past problems related to high regenerator and catalyst temperatures are substantially obviated by the processing concepts of the invention. Indeed this invention encourages high catalyst regeneration temperatures and takes advantage of these high temperatures of the catalyst to cause the desired cracking reactions to occur, at high conversion and high selectivity to gasoline and products which are gasoline precursors on a once through basis, without excessive coke formation. Fluid catalytic cracking is successfully practiced with feed stocks derived by distillation, solvent extraction and by hydrogenation, up to distillation ranges capable of instantaneous vaporization by hot regenerated catalyst. Experiments with cracking of the high boiling residual hydrocarbon components have met with less than desired results due in substantial measure to the fact that the prior experimenters were considerably constrained and failed to appreciate that success is only possible if substantially instantaneous and complete atomization/vaporization is achieved by the initial contact of the feed with very hot catalyst at a temperature above the pseudo-critical temperature of the feed. This means that as the boiling range of a gas oil feed is increased by inclusion of residua, the catalyst temperature must also be increased. The prior art has not only failed to recognize this concept, and thus ignored these facts, but has deliberately restrained the process from achieving the necessary high catalyst temperature due to two factors:

(1) Metallurgical limits of the regeneration equipment, and (2) Thermal stability of the catalyst.

Current available fluid cracking art tends to agree that the maximum practical temperature of regeneration and, therefore, the resulting regenerated catalyst temperature should be restricted to within the range of about 1300°-1400° F. even though temperatures up to 1600° F. are broadly recited. The temperature restriction of 1300°-1400° F. in reality necessarily restricts therefore the feeds charged to catalytic crackers, to distilled, solvent extracted and hydrogenated gas oil stocks in order to achieve desired conversion levels.

The present invention deals with providing an arrangement of apparatus or equipment and techniques of using, which will permit extending the temperature of regeneration up to at least 1800° F. without unduly impairing catalyst activity. The invention also identifies an array of equipment or apparatus means capable of withstanding the severe temperature operations contemplated by the invention.

Thus, for example, the undistilled portion of crude oil boiling from about 400° F. or higher, up to the crude oil end point such as topped crude oils can be cracked under conditions achieving high conversions of the oil feed to form gasoline and lighter hydrocarbons with yield results comparable to prior art gas oil cracking including comparable coke makes. The need for expensive feed preparation techniques and apparatus in the form of distillation, solvent extraction, hydrogenation or various thermal processes is thus obviated.

The products produced from the process of the invention will be similar to those derived from more conventional gas oil fluid catalytic cracking operations. That is, $C_2$'s and lighter gases, $C_3$ and $C_4$ olefins, and paraffins, gasoline boiling from $C_5$'s to 430° F. end point and cracked gas oils are obtained. The cracked gas oils thus obtained and known as light and heavy cycle oils or decanted oil are of such a quality that they can be hydrogenated for sale as low sulphur fuel oils, mildly hydrogenated and returned to the fluid catalytic cracker for more complete conversion to gasoline or preferably, hydrocracked more completely to gasoline boiling components.

Hydrocracking of the cracked gas oils obtained as herein described to form gasoline coupled with alkylation of the catalytic $C_3$'s and $C_4$'s results in yields of gasoline per barrel of 400° F.+ crude oil residuum charged to the catalytic cracker of up to 125% plus 3–4% propane. Such an overall processing sequence is in energy balance if not a net exporter of fuel gas and steam to other applications. The energy balance includes that required for the crude oil topping operation.

A most important parameter for successful residual oil cracking is to be ensured of a most complete intimate flash contact and substantially complete atomization/vaporization of the feed substantially upon contact with the hot catalyst. The residual higher boiling portion of the feed must also be substantially vaporized upon contact with hot regenerated catalyst, because only by more complete atomized vaporization of the feed components can the feed be more completely cracked to gasoline yielding components. What does not vaporize remains essentially unconverted resulting in high yields of catalytic cycle oils and/or is adsorbed on the hot catalyst surface and tends to be converted particularly to coke, thereby resulting in a loss of gasoline yield and a lowering of catalyst activity. For optimum conversion, the mix temperature should at least be equal to a preferably above the psuedo-critical temperature of the feed charged but not so much higher that undesired overcracking occurs.

The feed preheat temperature, the temperature of the hot regenerated catalyst, the volume of diluent such as steam injected with the feed and the unit operating pressure are the four main operating variables readily available to achieve the conditions necessary to accomplish substantially complete vaporization of the feed and, in turn, achieve a high selectivity conversion to gasoline and lighter compounds and the production of heavier oils of a quality suitable for hydrocracking to additional gasoline.

An additional desired operating parameter is that of providing an equilibrium temperature in the riser cross-section, substantially instantaneously with well designed and arranged multi-injection nozzles. A feed exit velocity at the nozzles of 10 to 50 feet per second is particularly desired, with the feed nozzles arranged as nearly as possible on the equal area circle of the riser cross-section. Each feed nozzle is preferably steam jacketed to reduce any coking of the hydrocarbon feed within the nozzle. Preferably about 5 wt.% or less steam or other suitable diluent material is also injected into the feed to reduce the equilibrium flash temperature, and to provide the best achievable oil atomizing effect. Typical dispersion steam rates range from 1 to 15 wt.% on feed.

The above identified factors relating to the contacting and mixing of the oil with the catalyst are intended to accelerate the mixture relatively uniformly within the vaporization zone in a minimum time frame and thus provide minimum catalyst slippage thus enhancing rapid heat transfer from the hot catalyst to the oil feed and to prevent localized enhanced catalyst to oil ratios. That is, conditions are selected to ensure dilute phase contact between catalyst and oil feed in the vaporization section as opposed to localized dense phase contact.

Typically, a reduced crude feed contains 10 to 12% hydrogen in its molecular structure. The lighter fractions are generally richer in hydrogen than the heavier fractions. Generally the heavier and larger molecular structures are considered hydrogen deficient. The lighter, hydrogen rich fractions are relatively thermostable but are relatively easily catalytically cracked with special catalysts such as zeolite containing catalysts. The heavier hydrogen deficient fractions are thermo-unstable and readily thermocracked on contact with solids at temperatures in the range of from 1000°–1800° F. Indeed the instantaneous and complete vaporization of the heavy fractions, discussed over, encourages simultaneous thermocracking of the high molecular weight components (asphaltenes) leading to the ultimate successful conversion of the total feed to high gasoline yields with low coke make.

Achieving complete atomization/vaporization of the heavy components of feed substantially instantaneously upon contact with the catalyst through the mechanisms of high catalyst temperature, low hydrocarbon partial pressure plus the use of a multi-nozzled feed injection system to prevent localized bed cracking will encourage the desired thermocracking of the large asphastene type structures. Failure to accomplish the above will lead to the phenomenon of "coke shut-off". This is a phenomenon where heavy hydrogen deficient molecules block the pores of the catalyst rendering the catalyst ineffective in terms of producing high conversions to desired products from either the light or heavy components of the feed.

In the design and operation of a unit of the type described by this invention a basic consideration is that the temperature of catalyst regeneration is unrestrained at least up to a temperature of about 1800° F. While the factors of feed preheat temperature, riser temperature, hydrocarbon partial pressure, and the nature of feed injection and distribution are important, they each have practical limitations and once each is optimized with respect to their practical limitation one must rely upon the fact that the temperature of the regenerator is unrestrained and can be allowed to rise to suit the needs of a particular feed stock to achieve the desired instantaneous vaporization and simultaneous thermocracking of the large, less stable molecular structures.

Table 1 shows the effect on gasoline and coke make when cracking a particular atmospheric resid without a regeneration temperature restraint compared to cracking with the regenerator constrained with respect to temperature. These operations are compared to cracking a gas oil obtained from the same crude oil following vacuum reduction to remove asphaltic type components and cracking the resultant gas oil under prior art conditions.

Table 1 shows that as the regenerator or catalyst temperature is restrained in a resid cracking operation gasoline yield decreases significantly and coke make increases rather correspondingly. It should also be noted that residua can be cracked to higher gasoline yields and at similar coke makes as obtained with a conventional gas oil feed stock.

Table 2 emphasizes the same factors wherein gas oil cracking data is shown compared to 10 vol.% and 20 vol.% vacuum residua added to the same gas oil feed. This tabulation demonstrates that the presence of the residua under optimized conditions results in higher overall conversions, higher gasoline yields and equal if not slightly lower coke makes than conventional gas oil cracking.

TABLE 1

Effect of Restraining Regenerator Temperature and Comparison of Atmospheric Bottoms With Gas Oil Only Feed

|  | Atmospheric Bottoms | | Gas Oil Only |
| --- | --- | --- | --- |
| Regenerator Temp: | High | Low | Conventional |
| Gasoline Yield Vo. %: | 67.7 | 63.5 | 61.5 |
| Coke Wt. %: | 5.3 | 8.0 | 6.1 |

TABLE 2

Gas Oil Cracking Present Art Versus Resid Cracking

| Mild Conversion Operation | | | |
| --- | --- | --- | --- |
|  | Gas Oil | Gas Oil + 10% Resid | Gas Oil + 20% Resid |
| Conversion Vol. % | 66.0 | 71.0 | 79.0 |
| Gaso. Yield Vol. % | 59.8 | 61.8 | 66.1 |
| Coke Wt. % | 3.0 | 3.6 | 5.6 |
| Optimum Conversion Operation | | | |
| Conversion Vol. % | 76.5 | 77 | 79.5 |
| Gaso. Yield Vo. % | 61.5 | 67.4 | 67.7 |
| Coke Wt. % | 6.1 | 4.3 | 5.3 |

Analyses of the products produced when cracking full atmospheric bottoms compared to gas oils only from the same crude oil show certain other interesting properties;

(1) Liquid products produced have higher average hydrogen contents.

(2) The research octane of the gasolines is significantly higher.

(3) The motor octane of the gasolines is significantly higher resulting in a much improved (R+M)/2 rating important in unleaded gasoline production.

(4) The cracked gas oil products commonly referred to as light and heavy cycle oils and decanted oil are substantially richer in di and tri condensed aromatics in preference to 4, 5 and 6 condensed aromatic rings. The high concentration of two and three member condensed aromatics in the cracked product makes these stocks highly desirable feeds for hydrocracking to gasoline.

(5) The coke produced under optimum operating conditions is very low in hydrogen content. Hydrogen levels in the 3-6 wt.% range are observed versus 8-10 wt.% obtained in prior art gas oil cracking operations. The lower hydrogen level of the coke produced is only explainable by the fact that the operating conditions employed encourages polymerization of polycyclics attracted to the catalyst surface, thereby releasing significant amounts of additional hydrogen for utilization in hydrogen transfer reactions in order to obtain the observed higher hydrogen content of the liquid products. This phenomenon is not observed in the present day gas oil cracking. These reactions are exothermic and hence significantly offset the endothermic heat of reaction of the primary cracking reaction. As a result the overall heat of reaction may be reduced as much as 40 to 50%. This contributes to lower catalyst circulation rates and consequently lower coke makes. The low hydrogen level in the coke is also a major factor of consideration when catalyst regeneration is conducted in the manner embodied in this invention.

A highly siliceous catalyst comprising one of alumina or magnesia with or without a catalytically active crystalline aluminosilicate or crystalline zeolite and of a fluidizable particle size preferably in the range of about 20 to about 200 micron size may vary considerably in cracking activity and levels of metal contaminants accumulated in the cracking operation. If the build up of the metals on the catalyst precludes maintaining a desired conversion level, it is contemplated employing a continuous or semi-continuous catalyst make up and removal or disposal of contaminated catalyst to maintain desired cracking activity aside from regeneration of the catalyst. On the other hand, the catalyst inventory may be substantially completely or partially replaced at turn around conditions or after an extended period of operation as is most convenient to the operation to achieve desired conversion of the feed.

Metals poisoning has long been recognized as a major obstacle to resid cracking. It has been found, however, that these metal contaminants can be passivated to some considerable extent at a high regenerator temperature and their adverse effects markedly reduced when the coke on recycled catalyst is maintained below about 0.05 wt.%. It has been found that about 5% conversion is lost per 0.1 wt.% coke on regenerated catalyst in addition to the expected coke deactivation, because of metals contamination. However, in the reduced crude cracking operation of this invention metals like nickel, vanadium and iron, show some beneficial properties such as activating or enhancing dehydrogenation, hydrogen transfer reaction, and promote CO combustion in the regenerator to achieve a lower coke on recycled catalyst without any need for an outside promoter. On the other hand sodium and all alkaline metals are still regarded as severe contaminants for particularly a zeolite containing catalyst. Thus, it has been found that feed desalting is a more economical approach to solving the sodium problem than using "soda sink" scavengers. With proper desalting of the feed, sodium therein can be controlled well below 1 PPM.

CATALYST REGENERATION

In order to achieve the desired high catalyst temperatures required to properly effect successful cracking of oils comprising residual oils, special regeneration techniques are required along with specially designed and employed apparatus or operating equipment. The high temperature cracking technique of the invention encourages relatively high levels of coke or hydrocarbonaceous material to be deposited on the catalyst during its exposure to the oil feed. Levels not normally below 1 wt.% and in some instances over 2 wt.% will occur.

It is particularly desirable, however, to regenerate the catalyst to carbon levels below 0.10 wt.% desirably to at least 0.05 and more preferably to about 0.02 wt.%. Regeneration techniques and apparatus or equipment employed in present day cracking of gas oils are unsuitable for achieving the severity of catalyst regeneration required in residual oil cracking for the following reasons:

(1) The high coke levels permitted to build on the catalyst are encouraged by low catalyst circulation rates, that is, by low catalyst to oil ratios. The combination of low catalyst to oil ratios and high carbon levels leads automatically to high regeneration temperatures. Temperatures that are in excess of the normal limits placed upon the stainless steel employed in present day regenerators, in the design of cyclone systems and catalyst withdrawal systems, etc. Also, the temperatures contemplated are beyond the current temperature limits of present day power recovery systems of about 1400° F.

(2) The high activity catalysts presently employed in catalytic cracking are not structurally thermo-stable at the high regenerator temperatures of the invention if this severe regeneration is conducted in a single stage or even in a multi stage regenerator where the multi stages are contained in a single vessel. Two very basic factors effect the catalyst stability during regeneration. At higher and higher coke levels on the spent catalysts, higher and higher catalyst particulate temperatures are developed as the high level of coke is burned in a single vessel even if multi stage single vessel regeneration is employed. These high surface temperatures themselves will render the catalyst ineffective. Secondly, the catalyst deactivates rapidly at high temperatures when the steam formed during coke combustion from associated molecular hydrogen is allowed to remain in contact with the catalyst when the catalyst reaches its highest temperature.

A particular embodiment of this invention is to conduct the regeneration of the spent catalyst in a two vessel system, comprising of two stage sequential catalyst flow system designed and operated in such a particular manner that the prior art catalyst regeneration difficulties are overcome. The catalyst regeneration arrangement of this invention achieves a coke on recycled catalyst level preferably less than 0.02 wt.% without exceeding undesired metallurgical limitation or catalyst thermostability.

The catalytic cracking process of this invention relates to the cracking of high boiling hydrocarbons generally referred to as residual oils and boiling initially at least 400° F. or higher, obtained from crude oil, shale oil and tar sands to produce gasoline, lower and higher boiling hydrocarbon components. The residual oil feed is mixed in a riser reaction zone with a highly active cracking catalyst recovered from a regeneration zone at a temperature preferably above the feed pseudo-critical temperature. The hydrocarbon feed preheated to a temperature below 800° F. is mixed with the very hot regenerated catalyst under conditions to form a generally vaporous hydrocarbon-catalyst suspension. A separation device or arrangement employed at the riser discharge separates from about 70–90% of the catalyst from the vapors. The unique feature of a particular device employed is that it allows higher than usual vapor superficial velocities in the disengaging vessel before the vapors enter the reactor cyclones. Hydrocarbons leaving the reactor cyclones are separated in a downstream fractionation column. The spent catalyst recovered from the riser cracking operation following stripping thereof and at a temperature in the range of about 900° F. to about 1100° F. and deactivated by 1.0 wt.% to 2.5 wt.% of coke, is passed to a temperature restricted dense fluid bed of catalyst in a first stage catalyst regeneration zone.

The regeneration operation to be accomplished in the first stage of regeneration is one of relatively mild temperature sufficient to burn all the hydrogen present in hydrocarbonaceous deposits and from about 10 to 80% of the total carbon therein. The regenerator temperature is restricted to within the range of 1150° F. to 1500° F. and preferably to a temperature which does not exceed the metallurgical limits of the regenerator. Flue gases rich in CO are recovered from the first stage regenerator and may be directed to a CO boiler for more complete combustion therein and/or through a power recovery section prior to a CO boiler. The mild regeneration serves to limit local catalyst hot spots in the presence of steam formed during the hydrogen combustion so that formed steam will not substantially reduce the catalyst activity. A partially regenerated catalyst is recovered from the first regenerator substantially free of hydrogen. The hydrogen freed catalyst comprising residual carbon is passed to a second stage higher temperature regenerator where the remaining carbon is substantially completely burned to $CO_2$ at an elevated temperature within the range of 1400° F. up to 1800° F.

The second stage high temperature regenerator is designed to minimize catalyst inventory and catalyst residence time at the high temperature while promoting a carbon burning rate to achieve a carbon on recycled catalyst less than 0.05 wt.% and more preferably less than 0.02 weight percent.

Traditionally designed regenerators utilized in prior art fluid catalytic cracking have contained various internal components fundamental to the successful operating needs of the process. These include cyclones, usually of several stages, designed to limit process losses of catalyst, catalyst return conduits from the cyclones to the catalyst bed (dip legs), various support and bracing devices for the above mentioned means. A hopper or similar device plus associated conduits to enable collection and withdrawal of catalyst back to the cracking part of the process. Of necessity, in prior art systems, these various above mentioned means are of metallic construction, usually stainless steel, and exposed directly to the combustion zone of the regenerator. It is the presence of these means in the combustion zone that limit the maximum temperature that can be supported in the regeneration of catalyst. Generally this leads to a maximum operating temperature of about 1400° F.

The second stage high temperature regenerator embodied in this invention eliminates the above mentioned limitations by locating all devices such as cyclones, dip legs, draw off hopper or well and support systems outside the combustion zone and indeed external to the regenerator itself. The regenerator vessel, void of any internals above the catalyst combustion zone, is refractory lined as are all connecting conduits, external cyclones and dip legs. The design of such a regenerator combination is considered to be an improvement over any known prior art. Regenerated catalyst at a desired elevated temperature is withdrawn from the dense catalyst bed of the second stage regenerator by means of a withdrawal well external to the regenerator vessel. The withdrawn catalyst is charged to the riser reactor at the desired elevated temperature and in an amount sufficient to vaporize the hydrocarbon feed charged according to the operating techniques of this invention. Hot flue gases are fed to external cyclones for recovery of catalyst fines before further utilization as by passing to a waste heat recovery system and then to an expander turbine or discharged to the atmosphere. Due to the fact that the cyclones of the highest temperature regeneration stage are externally located, some major and significant advantages aside from those cited above are gained.

Once the cyclone separators are moved from the interior of the catalyst regeneration device to the exterior, it is practical to reduce the diameter of the cyclone device and improve its efficiency in such a way that a single stage cyclone separator means can be used in place of a two stage cyclone means and yet accomplish improved separation efficiency. This is accomplished by use of an obround flue gas transfer pipe including a curved section thereof external to the cyclone but coinciding with the cyclone curvature and tangentially connected to the cyclone. This curved obround transfer means induces an initial centrifugal motion to the hot flue gas catalyst particle suspension thereby encouraging substantially improved cyclone efficiency and enabling a significant reduction in cyclone diameter. In addition, a most significant factor favoring the use of the external cyclone is that the cyclone overall length can be increased as it does not have to fit inside a refractory lined regenerator vessel of limited space and the cyclone separating efficiency is again significantly improved. The net effect of the above two design considerations is that a single stage external cyclone is the operating equivalent of a two stage internal cyclone system. Externally located refractory lined cyclones can be fabricated of carbon steel even with a regenerator temperature up to 1800° F. Furthermore, the external cyclones can be checked during on stream use with an infrared camera and easily replaced during a shutdown.

The residual oil cracking process of this invention is a breakthrough in conventional FCC technology in that it allows one to convert the high boiling residual components and provide the necessary and catalyst temperatures while at the same time providing an environment no appreciably harmful to the catalyst employed in the process. This ultimate high temperature catalyst regeneration operation is required to achieve the substantial instantaneous atomization/vaporization of the residual oil by the catalyst to convert the bottom of a barrel of crude, shale oil, etc., and any related liquid hydrocarbonaceous compound into gasoline. This is a major step toward reducing the dependence of 'free world nations' on imported crude oil.

Additional benefits resulting from the resid cracking process of this invention are a reduction in energy consumption in the overall processing of crude oil, and a reduction in both air and water pollution. Some of these savings are achieved by shutting down vacuum distillation units and/or various thermal processes in some instances. These and other known prior art processes would normally be used to further process atmospheric residua. Typical energy savings in a crude unit operation by shutting down a vacuum unit is about 0.6 vol.% to 1.0 vol.% on crude charge. Also, air and water pollution frequently associated with the aforementioned deleted process will be eliminated.

A further benefit resides in obtaining a sulfur removal of about 60-70% in the described resid cracking process. The thus formed $H_2S$ may be removed by amine scrubbing and fed to a claus unit for elemental sulfur recovery and sales as such, as opposed to eventual release as $SO_2$ in combustion processes.

It will be recognized by those skilled in the art that the conversion of residual hydrocarbons may be effected in a number of different apparatus arrangements such as in a riser cracking zone provided with multiple hydrocarbon feed inlet means thereto, in a riser contact zone discharging into a relatively shallow dense fluid catalyst bed to aid separation of hydrocarbon products from catalyst or any other arrangements suitable for the purpose. However, in any of these hydrocarbon conversion arrangements, regeneration of the catalyst used therein is more effectively improved by using the regeneration techniques of this invention. Therefore the regeneration concepts and operating techniques defined by this invention may be used to considerable advantage in any catalytic cracking operation.

FIG. I is a diagrammatic sketch in elevation of a side by side two stage regenerator arrangement in combination with a riser hydrocarbon conversion zone wherein a suspension discharged from the riser is separated initially external to a catalyst collecting zone comprising cyclone separating means. Catalyst thus separated and collected is passed to a lower regeneration zone in the sequence of regeneration zones.

FIG. II is a diagrammatic sketch in elevation of a cyclone separator arrangement which may be employed with the apparatus arrangement of FIG. I.

FIG. III is a diagrammatic top view sketch of the cyclone arrangement of FIG. II.

FIG. IV is a more detailed diagrammatic sketch of the feed nozzle arrangement used in conjunction with the lower portion of the riser reactor.

DISCUSSION OF SPECIFIC EMBODIMENTS

In the processing schemes discussed below, arrangements of apparatus are provided for accomplishing the relatively high temperature catalytic cracking of a residual oil to produce gasoline boiling range material and hydrocarbon materials readily converted into gasoline boiling components and fuel oils. Regeneration of the cracking catalyst so employed is accomplished particularly in a two stage catalyst regeneration operation maintained under temperature restricted conditions in a first separate regeneration zone to particularly remove hydrogen deposited by hydrocarbonaceous products of the cracking operation. CO formation in the first generation zone is not particularly restricted and deactivation of the catalyst by steam formed in the hydrogen burning operation is held to a desired low level. Thereafter, hydrogen free residual carbon is removed from the partially regenerated catalyst in a second separate relatively dense fluid catalyst system at a more elevated temperature and sufficiently high oxygen concentration restricting the formation of any significant quantity of CO or steam by effecting combustion of residual carbon deposits on the catalyst. The temperature of the second stage catalyst regeneration is allowed to rise sufficiently high to provide a desired oil contact temperature. Generally the temperature range of the regenerated catalyst will be from about 1400° F. up to 1800° F. The regeneration flue gas of the second stage regeneration operation will therefore be substantially CO free if not completely free of CO. Since the flue gas of the second stage regeneration operation will be $CO_2$ rich, such $CO_2$ rich gas may or may not be employed thereafter for steam generation, stripping catalyst between stages of the process and other uses for such gas as desired. The catalyst thus regenerated and comprising a residual carbon on catalyst of less than about 0.20 weight percent and preferably less than 0.05 wt.% is recycled to the cracking operation.

It will be recognized by those skilled in the art that the processing scheme of this invention minimizes high temperature steam deactivation of the catalyst and is an energy conserving arrangement which is particularly desired in this day of energy restrictions. That is, the two stages regeneration operation of this invention reduces the air blower requirement over that of a single stage regeneration operation while accomplishing more complete coke removal. The first stage restricted relatively low temperature regeneration is not restricted to CO formation wherein steam is usually formed and the second stage higher temperature regeneration operation is accomplished in the absence of formed steam needs to remove only a portion of the total carbon initially deposited on the catalyst. These energy conserving operating conditions are of considerable economic advantage in that a smaller CO boiler for producing process utilized steam can be used since the volume of flue gas from the first stage regeneration step is less than that of a single stage regeneration system to accomplish a similar desired coke removal. The much higher temperature $CO_2$ flue gas recovered from the separate second stage regeneration operation and abscense any significant combustion supporting level of CO may be cooled through a device or heat exchange means generating additional steam.

The processing arrangement of the invention provides a further energy conservation in that by charging atmospheric residual oil feed to the cracking operation, energy intensive vacuum distillation and other forms of feed preparation requiring significant energy are eliminated. Steam generated as above identified and/or process normally gaseous hydrocarbons may be used with the feed as a diluent to improve atomization of the feed upon contact with the hot regenerated catalyst. The catalyst charged to the cracking operation will be at a higher temperature than is normally obtained in the prior art single stage temperature limited regeneration operation and is obtained without steam and thermal damage to the catalyst. In addition the regeneration sequence of the invention more economically contributes more heat to the desired vaporization and endothermic conversion of the residual oil hydrocarbon charge as herein provided. Further energy conservation advantages are achieved by virtue of the fact that a residual oil comprising distress components of the crude oil are processed to more desirable products including gasoline through the elimination of satellite high energy consuming operations, such as vacuum distillation, propane deasphalting, visbreaking, delayed coking, hydrogen enriching operations and combinations thereof as employed heretofore in the petroleum refining industry.

The processing combinations of the present invention contemplate replacing catalyst circulated in the system with catalyst particles of a lower metals loading, or content, obtained for example as fresh catalyst or equilibrium catalyst from other cracking operation. Thus, a portion of the catalyst particles separated in the first stage regeneration operation or the second stage regeneration operation or both as normal catalyst loss may be replaced with fresh catalyst or catalyst particles of suitable cracking activity and comprising lower levels of metal contaminants.

The operating concepts of the present invention are useful in designing grass roots systems and adaptable to many different refining operations now in existance and comprising a single regeneration operation in combination with a hydrocarbon conversion operation such as riser cracking or a dense fluid bed cracking operation. In any of these operations it is intended that the regeneration temperature necessarily be restricted to a low temperature first stage and a second higher temperature separate regeneration operation in order to achieve the advantages of the present invention particularly with respect to energy conservation and eliminating high temperature damage to the cracking catalyst in the presence of formed steam.

It is immediately clear that the regenerating processing concepts of this invention lend themselves to improving substantially any hydrocarbon conversion process whether or not the hydrocarbon charged to the cracking operation comprises distress asphaltic components and metal contaminants or is merely a high coke producing charge material relatively free of significant amounts of metal contaminants and/or asphaltenes. However, as provided herein, the advantages of the processing innovation of this invention substantially improve as satellite treatment of the crude hydrocarbon charge to remove these materials is reduced.

It will be further recognized by those skilled in the prior art, that existing temperature restricted catalytic cracking and regeneration apparatus may be modernized to achieve the higher temperature operations of this invention with a minimum capital expenditure and downtime whether or not one is modernizing a stacked single stage reactor regenerator arrangement, a side-by-side single stage reactor regenerator arrangement or one of the more modern units comprising a riser reactor hydrocarbon conversion zone in combination with a dense catalyst bed in open communication wtih an upper riser catalyst regeneration operation.

Referring now to FIG. I, a hydrocarbon riser reactor 2 is provided. A hydrocarbon feed is introduced to a lower portion of the riser 2 by conduit means 4 to which steam may be introduced by conduit 6 communicating therewith. Fluffing or aerating gases such as a $C_4$ minus hydrocarbons or other suitable gas is introduced by conduit 8. Hot regenerated catalyst at a temperature above the feed psuedo-critical temperature is introduced to the riser lower portion by conduit 12 in an amount to form a high temperature vaporized mix with the feed as herein provided. The high temperature suspension thus formed and comprising hydrocarbons, diluent and suspended catalyst thereafter passes through the riser under substantially plug flow velocity conditions minimizing catalyst slippage and providing a hydrocarbon residence time less than 10 seconds. The vaporized hydrocarbon-catalyst suspension comprising products of catalytic conversion pass laterally from the top of the riser through conduit 14 to a zone 16 which changes the direction of flow of the suspension and form separation thereof. Conduit 14 may be horizontally carved to initiate suspension separation before entering zone 16. A rough separation of catalyst from hydrocarbon vapors is further promoted in zone or device 16 so that a substantial portion of the catalyst tends to fall down one side of the separating device into a downcomer conduit 18 and separate from hydrocarbon vapors. Hydrocarbon vapors thus separated are caused to flow through an opening 20 in the upper wall of conduit 18 and thence by conduit 22 into a cyclone separator 26 in vessel 24. One or more cyclone separators 26 may be used in parallel or sequential arrangement. Conduit 22 opens into vessel 24 and adjacent to the mouth of the cyclone separator 26. On the other hand, if vessel 24 is large enough to handle more than one cyclone separator such as a plurality of cyclone separators comprising two or more cyclone separators then conduit 26 may be attached to and feed directly into one of the cyclone separators with stripping gas and stripped products passing through another separate cyclone separator. The separated vaporous hydrocarbon product and stripping gas such as steam are thereafter recovered passed by conduit 25 to a product fractionation zone not shown.

Catalyst particles separated in the one or more cyclone separators represented by separator 26 is caused to flow by displegs to a mass of catalyst collected in the bottom lower portion of vessel 24. The catalyst separated by the rough separator arrangement above discussed is collected in a downcomer zone 18 and thereafter the catalyst is passed from the bottom thereof and conduit 30 into the fluid bed of catalyst 32. Catalyst bed 32 is in open communication with an external stripping zone 34 through which the catalyst downwardly passes. Sufficient steam is added by conduit 38 to a distributor in the bottom of the stripper to maintain catalyst bed 32 thereabove in fluid like condition during stripping thereof.

The stripped catalyst at a temperature in the range of 900° F. up to about 1200° F. is withdrawn from the bottom of stripping zone 34 by standpipe 40 comprising flow control valve 42 for discharge into a dense fluid bed of catalyst 44 in a first stage catalyst regeneration zone 52. All of the oxygen containing regeneration gas may be distributed and charged to the lower bottom portion of bed 44 by one or more conduits 46 and 48, at least one of which is connected to an air distributor 50. Catalyst bed 44 is retained in a lower portion of regeneration vessel 52 under restricted temperature regeneration conditions as herein provided. Cyclone separating means 54 and 56 are retained in the upper portion of vessel 52 for separating catalyst fines from CO rich regenerator flue gas. Regeneration flue gas rich in CO is withdrawn from zone 52 by conduit 58 provided with pressure control valve 130.

The regeneration operation intended to be accomplished in zone 52, the first stage regeneration operation, is one of relatively mild temperature conditions less than 1500° F. and effected with restricted oxygen concentrations selected to particularly achieve the burning of hydrogen associated with hydrocarbonaceous deposits and burn some carbon material. The operating conditions and oxygen concentration used are sufficient to restrict the temperature of the catalyst bed within the range of 1150° F. up to about 1500° F. This relatively mild regeneration operation is intended so that the presence of steam formed during hydrogen burning will not substantially reduce the catalyst activity. Thus, the first stage regeneration operation is considered a relatively low temperature regeneration operation effected under conditions which will produce a CO rich flue gas. Therefore, after burning is particularly restricted from occurring in the dispersed catalyst phase in the upper portion of regenerator 52 and provided cyclone separators. A CO boiler not shown is employed downstream of regenerator 52 to generate process steam by burning the CO in the CO rich flue gas. A power recovery unit may also be employed prior to CO combustion to recover energy from this stream.

The first stage regeneration operation is effected under temperature, pressure and oxygen concentration restriction conditions which will retain some residual carbon free of hydrogen on the catalyst for burning removal in a second separate higher temperature regeneration zone 88. The removal of carbonaceous material in the first stage to complete the removal of hydrogen associated with hydrocarbonaceous material may be within the range of 10 to 90 weight percent. It is proposed however that such carbon removal be restricted particularly to that needed to complete the removal of substantially all of the hydrogen component thereof under the lower temperature catalyst regeneration conditions not above 1500° F. The partially regenerated catalyst substantially free of hydrogen in the residual carbon deposits on the catalyst is withdrawn from the dense fluid bed of catalyst 44 by a withdrawal conduit 60 communicating with an external catalyst withdrawal zone 62. Catalyst withdrawal zone 62 maintains a dense fluid downflowing mass of catalyst 64 therein with an upper interface 66. Gas, such as oxygen, steam or $CO_2$, may be introduced by conduit 68 to a distributor grid to aerate and strip strippable material such as CO from the catalyst in stripper 62 before passing the carbon containing catalyst without entrained water vapor to the second stage high temperature regeneration operation. The stripped catalyst is withdrawn from zone 62 by standpipe conduit 70 and transferred to a relatively dense catalyst phase transfer zone 72 through a matching curved pipe section 74. A transporting or aerating gas may be added to transfer zone 72 throughout the length thereof and adjacent the lower end thereof to assist with moving the catalyst therethrough. Transfer zone 72 is in open communication with a substantially vertical catalyst transfer riser section 76 discharging into a dense fluid bed of catalyst 78 in a lower bottom portion of a second stage catalyst regeneration zone 88. Catalyst aerating, fluidizing or transport gas may be added to the conduits 72 and 76 by conduits 80 and 82 and others not shown along conduit 72. A portion of the air used for catalyst regeneration may be added by various aerating gas inlets with a substantial portion of oxygen containing regeneration gas being added by conduit 84 communicating with an air distributor 86. The discharge end of riser or catalyst transport conduit 76 is in this special embodiment capped and provided with elongated slots in the upper wall periphery thereof to provide suspension discharge slots for distribution of catalyst into the dense fluid catalyst bed 78 thereabove to complete carbon burning removal therefrom in the dense fluid bed of catalyst at a temperatures above 1500° F. and CO burning conditions.

Catalyst bed 78 is maintained in a separate refractory lined regeneration vessel 88 wherein the high temperature regeneration of the catalyst above 1500° F. is accomplished in the absence of hydrogen or formed steam. That is, it is contemplated completing in the presence of sufficient oxygen a high temperature carbon combustion regeneration operation in combination with substantially complete combustion of CO, if not complete combustion of CO, in the dense catalyst bed 78 to form $CO_2$. The high temperature regeneration operation to remove residual carbon on the catalyst is not temperature restricted and thus the temperature may be within the range of 1500° F. up to about 1800° F. Thus, the temperature of this second stage regeneration operation is allowed to float as required to remove substantially all residual coke on catalyst particles charged thereto.

The high temperature regeneration stage of this invention is accomplished in a vessel lined with a refractory material. The cyclone separators normally employed to separate catalyst fines from regeneration flue gas are located outside vessel 88 so that high temperature metallurgical problems are eliminated. In the specific arrangement of the drawing, FIG. I, the flue gas is withdrawn from a plenum chamber 96 above the regeneration vessel shown as two separate flue gas streams 98 and 100 each passing through a separate cyclone separator 102 and 106 respectively. A combined $CO_2$ rich flue gas stream may be recovered from cyclone separator 102 and 106 for use as desired such as generating process steam. Catalyst particles separated in the cyclone separators is passed by diplegs provided for each cyclone separator to the fluid catalyst bed 78 in vessel 88.

Regenerated catalyst at a temperature in the range of 1500° F. to 1800° F. is withdrawn from the dense catalyst bed 78 below level 92. The catalyst particles are recovered from the second stage regeneration with preferably less than 0.05 weight percent carbon on catalyst. The hot regenerated catalyst thus obtained is withdrawn by conduit 110 and passed to an adjacent refractory lined catalyst collecting zone 112. The upper level of catalyst retained in the catalyst collecting zone will depend on that retained in the regeneration zone and may comprise an upper bed level 114 or a higher level 116. The high temperature regenerated catalyst at a temperature of at least 1500° F. is contacted with an inert aerating gas with respect to catalyst deactivation introduced by conduit 118. This aerating gas is preferable other than steam because of the high temperature condition of the catalyst and therefore a $CO_2$ rich gas or other suitable gas, such as air or nitrogen, may be used without inactivating the catalyst. The thus contacted catalyst is withdrawn by standpipe 120 communicating with conduit 12. An aerating gas inert to the high temperature regenerated catalyst may be introduced to the standpipe at least above flow control valve 124 by conduit 122. The high temperature regenerated catalyst passing thru valve 124 is then charged into the riser cracking zone by conduit 12 for use as herein described. Aerating gas passes from zone 112 to the regenerator by conduit 126 as shown.

The combination operation comprising catalytic cracking and two separate stages of catalyst regenerator above discussed is a pressure balanced operation which relies upon the use of pressure control valves 130 in conduit 58 and 132 in conduit 110 inter-related to and responsive to the pressure maintained in vessel 24 and cyclone 26. Furthermore, the temperature at the top of riser 2 may be relied upon to exercise control on the catalyst circulation rate and the temperature particularly maintained in the riser hydrocarbon conversion zone.

Referring now to FIG. II, there is shown a "T" shaped flue gas withdrawal arrangement with large cyclone separators hung from the horizontal arms of the "T", which may be used in place of that shown in FIG. I. In the arrangement of FIG. II, the catalyst bed 78 corresponding to bed 78 of FIG. I is subjected to high temperature regeneration above 1500° F. and is formed by introducing catalyst with fluidizing gas, such as air, by riser conduit 76 into the fluid bed of catalyst 78. Regenerated catalyst at a temperature generally above 1500° F. is withdrawn by conduit 79 to an adjacent collecting vessel 12, wherein the withdrawn catalyst is aerated by gases introduced by conduit 118. Catalyst is then withdrawn by standpipe 120 for use as discussed above for conversion of the residual oil charged. Gases charged by conduit 118 to aerate the catalyst are withdrawn from the top of zone 112 by conduit 126 for passage to regenerator 88. Flue gases, $CO_2$ rich, and comprising little free unused oxygen are withdrawn from the vessel 88 by conduit 134 in this specific embodiment capped at the upper end thereof and provided with at least two radiating arms or conduits 136 and 138 to resemble a "T" shaped flue gas withdrawal means. The radiating arms are obround in cross section comprising the long sides of a rectangle with rounded top and bottom sides. The radiating arms viewed from the top are either straight sections, but more preferably horizontally curved in an outer portion thereof and prior to tangential communication with attached cyclone separators 140 and 142. The use of horizontally curved conduits 136 and 138 is preferable since they initiate centrifugal separation of entrained catalyst fines from flue gases before entering the cyclone of similar curvature in the cyclone barrel thereby improving the separating efficiency of the combinations. The catalyst fines thus separated in the external relatively large refractory lined cyclone separators are returned to the catalyst bed 78 in vessel 88 by diplegs, such as 144. $CO_2$ rich flue gases are recovered from cyclones 140 and 142 by conduit means 146 and 148 respectively at a temperature within the catalyst regeneration range of 1500° to 1800° F. These hot gases may be used to generate process steam in equipment not shown. It is also contemplated employing in yet another embodiment two cyclones in sequence and of a size that they may also be lined with refractory materials. That is, all of the apparatus means of FIG. II above discussed is refractory lined to withstand the high temperatures contemplated by such equipment.

FIG. III is a diagrammatic top view of the regeneration cyclone arrangement of FIG. II to particularly emphasize the use of curved obround conduits 136' and 138' communicating tangentially with cyclones 140' and 142'. The curvature of the cyclone barrel and the obround transfer conduits are about the same in this specific embodiment. However, the curvature of the obround conduits may be altered considerably to decrease straight sections in such transfer conduits, thereby using any centrifugal generated moment to its optimum advantage in separating catalyst particles from flue gases. In the arrangement of FIG. III the flue gas streams 146' and 148' are shown coupled to a common withdrawal conduit 150 for further use as herein provided.

FIG. IV is a more detailed diagrammatic drawing of the feed nozzle arrangement or system contemplated for use with the hydrocarbon conversion zone 2 of FIG. I. Since the residual oil hydrocarbon conversion temperatures contemplated are of a high order of magnitude, the riser reactor and particularly the lower portion thereof is lined with a refractory material, as shown, suitable for the purpose and which will stand temperatures in excess of 1400° F. In this arrangement, hot regenerated catalyst is conveyed by refractory lined conduit 12' to a lower bottom portion of the riser conversion zone wherein it is initially contacted with an aerating or fluidizing gas introduced by conduit 8'. An opening 9 is provided in the bottom of riser 2 for withdrawing catalyst when required. Also, means 11 is provided for withdrawing samples as desired.

The suspension formed with fluidizing gas and hot catalyst particles passes upwardly through the riser and about a plurality of oil feed nozzles or pipes 4 provided and protruding through the wall of the riser. That is, the riser wall is provided with a donut shaped half ring section or protruding bussel section 10, which is filled with refractory material through which the plurality of pipe nozzles 4' protrude and terminate in an expanded cross section of the riser. The pipe nozzles 4' numbering 6 in a specific embodiment are arranged to terminate on an equal cross sectional area circle of the partially expanded riser cross section, as shown. The oil pipe nozzle is jacked by a steam confining pipe section 13 forming an annulus with the oil feed pipe 4'. Steam is charged to this annular section by conduit 15. The oil feed is charged by conduit 4' and a diluent material is charged by conduit 6' for admixture with the oil feed. The high temperature suspension desired by the processing concepts of this invention and comprising vaporized residual oil is thus obtained and caused to flow upwardly through the riser and discharge from an upper portion thereof as discussed above with respect to FIG. I.

It is to be understood that no undue restrictions are to be imposed by reason of the specific examples discussed above since many of the same concepts discussed have broad application in the processing of hydrocarbons varying considerably in boiling range as well as products desired.

We claim:

1. In a combination gas oil catalytic cracking-regeneration operation comprising a riser cracking zone in combination with a single regenerator zone of restricted temperature limitations, below 1400° F., the method for improving the operation with respect to feeds processed, catalyst regeneration and providing a high temperature operation for processing high boiling heavy residual oils which comprises, providing a riser cracking zone in combination with an added second regeneration zone, said second regeneration zone adjacent to but above said restricted temperature regeneration zone, passing a suspension of hydrocarbon product vapor and catalyst following traverse of the riser cracking zone into a suspension breaking zone which promotes the downward flow of separated catalyst particles from product vapors entraining catalyst particles, passing the product vapors through a passageway immediately adjacent the suspension breaking zone in open communication with a cyclone separation zone, separating hydrocarbon product vapors from catalyst in said cyclone separation zone and recovering said hydrocarbon product vapors separately from cyclone separated catalyst, stripping catalyst separated from hydrocarbon vapors before downward passage thereof to a lower portion of a dense fluid bed of catalyst in said temperature restricted regeneration zone, effecting a partial regeneration of the catalyst in a dense fluid catalyst bed in said temperature restricted regenerating zone up to 1400° F. with an amount of oxygen sufficient to effect from 10 to 90 wt% removal of carbonaceous material and produce a flue gas rich in CO and provide catalyst particles with a residual carbon thereon, passing the partially regenerated catalyst through an external stripping zone and thence through a confined transfer zone to a bottom portion of the upper regeneration zone, further regenerating the partially regenerated catalyst comprising residual carbon in a dense fluid catalyst bed in the second regeneration zone at a temperature of from about 1500° F. up to 1800° F., and passing high temperature regenerated catalyst from said second regeneration zone through an external stripping zone before passage to said riser cracking zone for admixture with said high boiling heavy feed oil charged thereto.

2. The method of claim 1 wherein the high boiling hydrocarbon feed is introduced to the lower portion of the riser cracking zone above the inlet of hot regenerated catalyst inlet thereto through a plurality of steam jacketed feed inlet zones about the riser periphery.

3. The method of claim 1 wherein the high boiling hydrocarbon feed is introduced to said riser cracking zone along with a diluent material, such as steam, normally gaseous $C_4$ minus hydrocarbons and mixtures thereof.

4. The method of claim 1 wherein the high boiling feed comprises metal contaminants which accumulate upon the catalyst during cyclic use thereof and catalyst particles contaminated with metal deposits are continuously or intermittently replaced with catalyst particles of lower metal content.

5. The method of claim 1 wherein flue gas cyclone separating zones associated with said high temperature regeneration operation are located outside of said regeneration zone and connected thereto by flue gas transfer zones horizontally curved and protected internally from heat damage by a refractory lining material.

6. The method of claim 1 wherein high temperature catalyst particles separated from said second regeneration zone are contacted with aerating gas from the group consisting of air, $CO_2$, steam, normally gaseous hydrocarbons and combinations thereof prior to contacting the catalyst with the oil feed in the riser cracking zone.

* * * * *